(12) United States Patent
Nylund

(10) Patent No.: US 6,327,324 B2
(45) Date of Patent: Dec. 4, 2001

(54) NUCLEAR FUEL ASSEMBLY

(75) Inventor: Olov Nylund, Västerås (SE)

(73) Assignee: Westinghouse Atom AB (SE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/202,494
(22) PCT Filed: Jun. 3, 1997
(86) PCT No.: PCT/SE97/00960
  § 371 Date: Feb. 10, 1999
  § 102(e) Date: Feb. 10, 1999
(87) PCT Pub. No.: WO97/49094
  PCT Pub. Date: Dec. 24, 1997

(30) Foreign Application Priority Data

Jun. 20, 1996 (SE) ................................. 9602449

(51) Int. Cl.$^7$ ............................................. G21C 3/326
(52) U.S. Cl. ................. 376/433; 376/434; 376/435; 376/447; 376/429; 376/428; 376/419; 376/426
(58) Field of Search .................... 376/434, 435, 376/428, 433, 419, 444, 447, 426, 429, 425, 376; 176/78

(56) References Cited

U.S. PATENT DOCUMENTS

| | | | |
|---|---|---|---|
| 3,120,471 | * 2/1964 | Koutz et al. | 376/419 |
| 3,179,571 | * 4/1965 | Schabert et al. | 176/68 |
| 3,185,630 | * 5/1965 | Ammon | 176/54 |
| 3,368,945 | * 2/1968 | Keller et al. | 176/77 |
| 3,663,365 | * 5/1972 | Pettinger et al. | 176/77 |
| 4,040,902 | * 8/1977 | Mysels | 176/30 |
| 4,326,922 | * 4/1982 | Ferrari et al. | 376/435 |
| 4,629,599 | 12/1986 | Crowther et al. | 376/438 |
| 4,708,845 | * 11/1987 | Mildrum et al. | 376/435 |
| 5,009,837 | * 4/1991 | Nguyen et al. | 376/261 |
| 5,089,210 | * 2/1992 | Reese et al. | 376/212 |
| 5,094,805 | 3/1992 | Suchy et al. | 376/212 |
| 5,116,567 | * 5/1992 | Febbern | 376/433 |
| 5,162,097 | * 11/1992 | Fennern | 376/433 |
| 5,202,084 | * 4/1993 | Fennern et al. | 376/433 |
| 5,204,053 | * 4/1993 | Fennern | 376/267 |
| 5,337,337 | * 8/1994 | Aoyama et al. | 376/435 |
| 5,383,229 | * 1/1995 | Nakajima et al. | 376/434 |

FOREIGN PATENT DOCUMENTS

| | | | |
|---|---|---|---|
| 2 204 168 | 8/1973 | (DE) . | |
| 4108767 | * 10/1992 | (DE) | 376/433 |
| 0 196 655 A1 | 1/1986 | (EP) . | |
| 0 364 623 A1 | 4/1990 | (EP) . | |
| 1406709 | * 6/1965 | (FR) . | |
| 918370 | * 2/1963 | (GB) . | |
| 1283195 | * 7/1972 | (GB) | 376/433 |
| 0009792 | * 1/1977 | (JP) | 376/435 |
| 52-9792 | * 1/1977 | (JP) . | |

(List continued on next page.)

Primary Examiner—Michael J. Carone
Assistant Examiner—John Richardson
(74) Attorney, Agent, or Firm—Connelly Bove Lodge & Hutz LLP

(57) ABSTRACT

A fuel assembly for a boiling water reactor comprising a plurality of fuel units (3a, 3b, 3c, 3d), stacked on top of each other, each one comprising a top tie plate (5), a bottom tie plate (6) and a plurality of fuel rods (4a, 4b, 4c) arranged between the top tie plate and the bottom tie plate. The fuel units are surrounded by a fuel channel (9) with a substantially square cross section. At least some of the fuel units comprise fuel rods with different diameters and different fuel quantities. The fuel rods are adapted such that fuel quantity and lattice space are optimized laterally and axially in the fuel assembly.

10 Claims, 2 Drawing Sheets

FOREIGN PATENT DOCUMENTS

| | | | |
|---|---|---|---|
| 0040187 | * 4/1978 | (JP) | ................................. G21C/1/20 |
| 0065697 | * 12/1982 | (JP) | ..................................... 376/435 |
| 41-8758 | * 5/1996 | (JP) . | |
| 500 900 | 9/1994 | (SE) . | |
| WO 96/20483 | 7/1996 | (WO) . | |

* cited by examiner

B - B

C - C

D - D

E - E

NUCLEAR FUEL ASSEMBLY

TECHNICAL FIELD

The present invention relates to a nuclear fuel assembly with a substantially square cross section for a boiling water reactor moderated by light water, comprising a plurality of fuel rods extending between a top tie plate and a bottom tie plate and being surrounded by a fuel channel.

BACKGROUND ART

In a nuclear reactor, moderated by means of light water, the fuel exists in the form of fuel rods, each of which contains a stack of pellets of a nuclear fuel arranged in a cladding tube. A fuel bundle comprises a plurality of fuel rods arranged in parallel with each other in a certain definite, normally symmetrical pattern, a so-called lattice. The fuel rods are retained at the top by a top tie plate and at the bottom by a bottom tie plate. To keep the fuel rods at a distance from each other and prevent them from bending or vibrating when the reactor is in operation, a plurality of spacers are distributed along the fuel bundle in the longitudinal direction. A fuel assembly comprises one or more fuel bundles, each one extending along the main part of the length of the fuel assembly. Together with a plurality of other fuel assemblies, the fuel assembly is arranged vertically in a reactor core. The core is immersed into water which serves both as coolant and as neutron moderator.

Since the coolant in a boiling water reactor is boiling, a ratio between water and steam is formed which varies axially in the core. At the bottom of the core, the temperature of the coolant is lower than the boiling temperature and is thus in a single-phase state, that is only water. At the top of the core, where the coolant has reached the boiling temperature, part of the water is transformed into steam, and the coolant is thus in a two-phase state. The higher up in the core, the greater is the percentage of steam in relation to the percentage of water. In the uppermost part of the core, the fuel rods are only covered with a thin film of water, outside of which steam mixed with water droplets is flowing, so-called annular flow.

If the thermal flow from a fuel rod becomes very great in relation to the coolant flow, there may be a risk of dryout. Dryout means that the liquid film becomes so thin that it is not capable of holding together, but it breaks up and forms dry wall portions, which locally leads to a considerably deteriorated heat transfer between the fuel rod and the coolant water resulting in a greatly increased wall temperature of the fuel rod. The increased wall temperature may lead to damage with serious consequences arising on the fuel rods. The risk of dryout exists substantially in the upper part of the fuel assembly.

Because of its lower density, steam is much inferior to water as moderator, which during operation of the reactor means that the higher up in the fuel assembly, the worse the moderation. In the core the fuel assemblies are surrounded by water which gives a good moderation of fuel rods near the fuel channel. In fuel rods in the central parts of the fuel assembly, on the other hand, inferior moderation will occur. Above all the central parts of the upper part of the fuel assembly will have an insufficient moderation. The reactivity of the reactor depends on the ratio of uranium to moderator. To obtain an optimum uranium-to-moderator ratio, the quantity of uranium should be smaller and the lattice space, that is, the free space between the fuel rods, should be larger in the upper part of the fuel assembly than in the lower part thereof.

Factors which are important to take into consideration when optimizing the fuel assembly are, in addition to reactivity and dryout, limitation of the linear load of the fuel rods, shutdown margin, and pressure drop.

A constantly recurring problem with boiling water reactors is how best to optimize the fuel assembly both axially and laterally with respect to uranium quantity and lattice space. Laterally, an optimization may be made, for example, by the choice of the diameter of the fuel rods, the distances between the fuel rods, and the number of fuel rods. A well-known method of achieving an axial optimization is to replace some of the fuel rods by part-length fuel rods. Part-length fuel rods have a shorter axial length than the traditional full-length fuel rods. Another method of achieving an optimization of the uranium quantity both axially and laterally is to vary the enrichment of the fuel in the fuel rods, which is shown in the German patent DE 40 14 861 A1. This patent shows a fuel assembly which has fuel rods with different enrichment in different lattice positions and certain of the fuel rods have several different enrichment contents axially.

A disadvantage with the above-mentioned optimization methods is that they are not capable of separately providing sufficiently efficient optimization of fuel and lattice space. With a conventional fuel assembly, it is difficult to achieve a good optimization in a simple manner. A solution to this problem is shown in International patent document PCT/SE95/01478 (Publ. No. WO 96/20483) which shows a flexible fuel assembly which can be optimized in a simple manner, both axially and laterally. The flexible fuel assembly comprises a plurality of fuel units stacked on top of each other, each comprising a plurality of fuel rods extending between a top tie plate and a bottom tie plate. The fuel units are surrounded by a common fuel channel with a substantially square cross section.

The needs of axial and lateral optimization differ between various reactors and various operating conditions. It is, therefore, desirable to be able to offer, for each individual customer, a fuel assembly which is optimized for the special needs of each individual customer. One problem is that it may be very expensive to supply different fuel assemblies to different customers since it requires a large number of different components which are both to be manufactured and be kept in stock.

SUMMARY OF THE INVENTION

The present invention relates to a fuel assembly which is simple to optimize, both axially and laterally, based on the needs of individual customers, but which can still be manufactured in a simple and rational, and hence economic, manner.

What characterizes a fuel assembly according to the invention will become clear from the appended claims.

A fuel assembly according to the invention may be composed of few, preferably three, standardized types of fuel rods, which are distinguished from each other in that they have different external diameters and different uranium quantities. With three types of fuel rods and a large number of fuel units, preferably at least seven fuel units in the fuel assembly, a very great freedom to optimize the fuel assembly, both axially and laterally, is obtained. The three different types of fuel rods may, in turn, be combined into a number of different types of fuel units with suitable properties for different levels in the fuel assembly and for different operating conditions. By distributing the different fuel units at different levels, a desired axial optimization may be achieved. Besides varying the distribution of the fuel, also the total quantity of fuel in the fuel assembly may be varied in a simple manner by varying the number of fuel rods of the different types. In addition, certain positions in the lattice may be left unoccupied, for example for improving the shutdown margin.

One advantage of the invention is that a large number of different fuel assemblies with different properties may be assembled from a small number of standardized units. At a small extra cost, a fuel assembly may be obtained which is tailored to the reactor and the operating conditions under which it is to serve.

Still another advantage is that the number of fuel rods with different enrichment levels may be limited, which means that the fuel rods become simpler and less expensive to manufacture.

DESCRIPTION OF THE PREFERRED EMBODIMENTS

Figure 1:
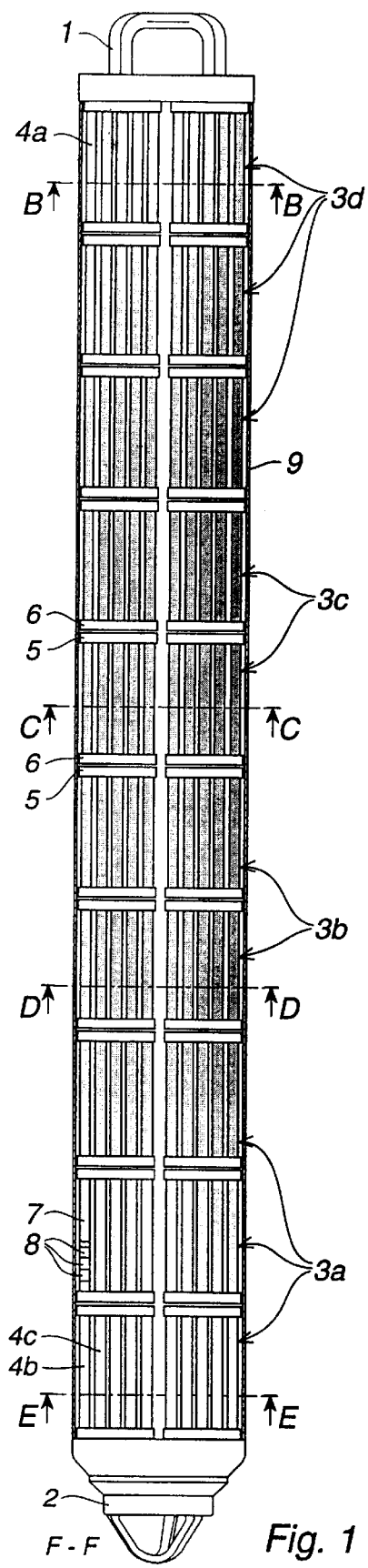
FIG. 1 schematically shows one embodiment of a fuel assembly according to the invention.

FIG. 1 shows a fuel assembly according to the invention. During operation, the fuel assembly is arranged vertically in the reactor core. The fuel assembly comprises an upper handle 1, a lower end portion 2 and a plurality of fuel units 3a, 3b, 3c and 3d stacked one above the other. The fuel unit comprise a plurality of fuel rods 4a, 4band and 4c arranged between a top tie plate 5 and a bottom tie plate 6. The fuel units are stacked on top of each other in the longitudinal direction of the fuel assembly and they are stacked in such a way that the top tie plate 5 in one fuel unit is facing the bottom tie plate 6 in the next fuel unit in the stack. A fuel rod contains fuel in the form of a stack of uranium pellets 8 arranged in a cladding tube 7. The fuel assembly is enclosed in a fuel channel 9 with a substantially square cross section. In this embodiment, the fuel assembly comprises four parallel stacks with ten fuel units in each stack.

Figure 2A:
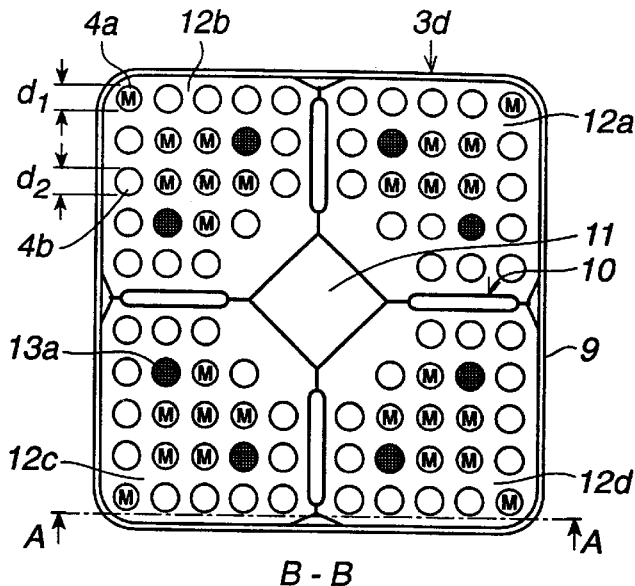
FIGS. 2a, 2b, 2c and 2d show horizontal sections B—B, C—C, D—D and E—E through the fuel assembly in FIG. 1

FIG. 2a shows a section B—B through the fuel assembly in FIG. 1. The fuel channel 9 is provided with a hollow support member 10 of cruciform cross section, which is secured to the four walls of the fuel channel. In the central channel 11 formed of the support member 10, moderator water flows. The fuel channel with the support member surrounds four vertical channel-formed parts 12a, 12b, 12c, 12d, so-called sub-channels, with an at least substantially square cross section. The four sub-channels each comprises a stack of fuel units. Each fuel unit comprises 24 fuel rods arranged in a symmetrical 5×5 lattice. By a fuel rod position is meant a position in the lattice. All the fuel rod positions in the lattice need not be occupied by fuel rods.

The fuel assembly has three different types of fuel rods 4a, 4b and 4c. In FIGS. 2a–2d the fuel rods 4a are designated M and the fuel rods 4a are designated P. The fuel rods 4b are not marked in the figures. A fuel rod 4a has a diameter $d_1$. A fuel rod 4b has a diameter $d_2$ which is about 8% larger than $d_1$ and contains about 15% more fuel than the fuel rod 4a. A fuel rod 4c has a diameter $d_3$ which is about 8% larger than $d_2$ and contains about 15% more fuel than the fuel rod 4b. By varying between the three fuel rod types in the different lattice positions, a great variation of fuel units may be created. The fuel rods with the largest diameter, 4c, have a relatively larger fission gas space than the fuel rods with the smallest diameter, 4a, in order thus to take into account different linear loads because of rod diameters and typical neutron-flux ratios. It is not sufficient that the diameter is larger but also the height of the fission gas space should be larger.

Figure 2B:
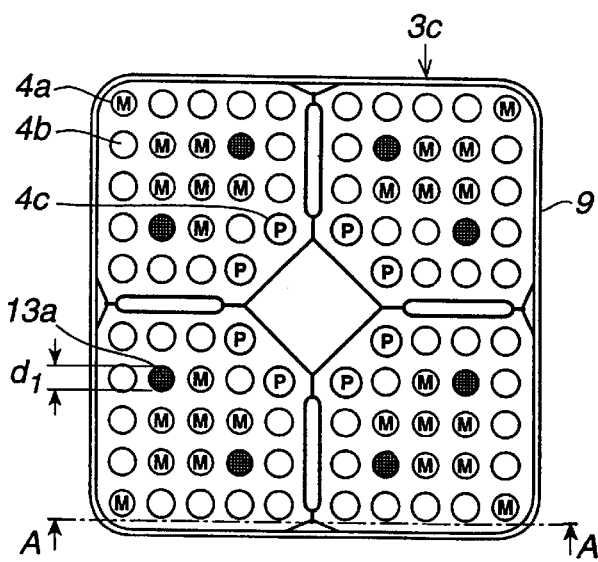
Figure 2C:
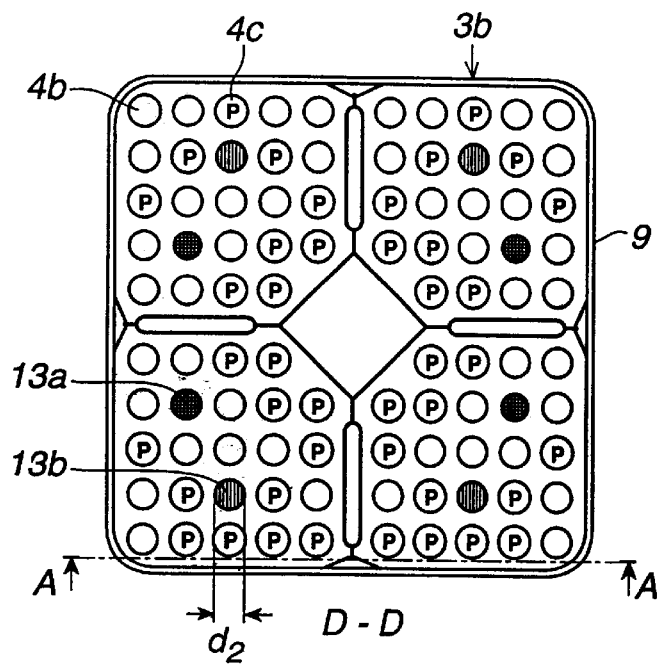
Figure 2D:
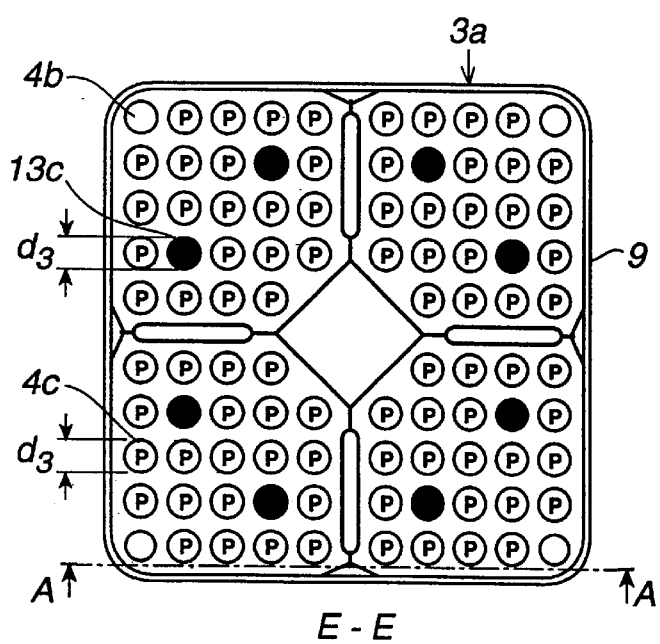

In this embodiment, the fuel assembly is composed of four different types of fuel units 3a, 3b, 3c, 3d at ten different levels. FIG. 2d shows a section E—E through the fuel unit 3a. The fuel unit 3d is formed to fit into the lower part of the fuel assembly where the neutron flux tends to be high for a large part of the operating cycle. This fuel unit almost exclusively comprises fuel rods of the 4c type, which is that of that fuel rods which has the largest cross-section area and contains most fuel. In the lowermost part of the fuel assembly, the significance of a reduced flow area because of the large cross-section area of the fuel rods is not so great since both the moderation and the cooling are good and the pressure drop is still low because of a low steam content.

The higher up in the fuel assembly, the fewer are the fuel rods with the largest diameter 4c and instead the number of fuel rods with a smaller diameter 4a and 4b increases. FIG. 2b shows a section C—C through the fuel unit 3c and FIG. 2c shows a section D—D through the fuel unit 3bFIG. 2a shows a section B—B through the uppermost fuel unit 3d, which comprises only fuel rods of types 4a and 4b, which both have a diameter and a fuel content which are smaller than those of the fuel rod 4c. In addition, the lattice positions nearest the water channel 11 are unoccupied. One advantage of the unoccupied positions is that the shutdown margin increases. In the upper part of the fuel assembly, the optimization of the fuel units takes place in order to minimize the risk of dryout and to obtain a low pressure drop.

To absorb part of the surplus reactivity in the fuel when it is fresh, certain of the fuel rods may contain a burnable absorber, for example gadolinium oxide. Such a fuel rod will be referred to below as an absorber rod. The diameter of the absorber rod determines its burnup rate. The absorber rods 13a, 13b, 13c are available in three different sizes with three different diameters $d_1$, $d_2$, $d_3$ which are the same as for the fuel rods. By arranging absorber rods with different diameters in the lattice, the content of burnable absorber may be finely-divided both axially and laterally with respect to reactivity, burnup behavior and power distribution.

Figure 3:
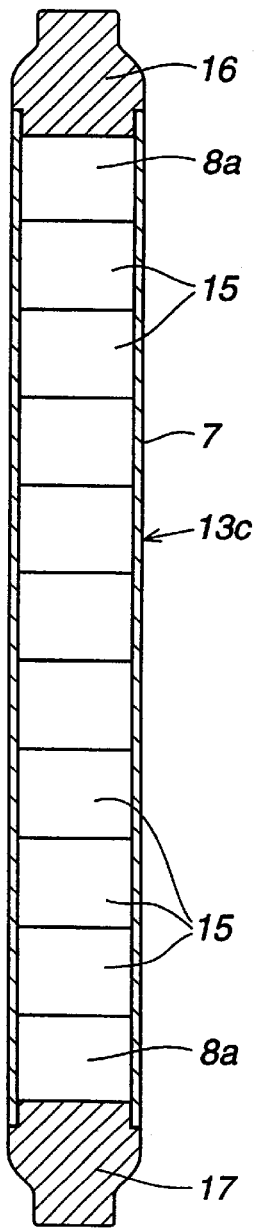
FIG. 3 shows a cross section of an absorber rod.

FIG. 3 shows an absorber rod 13c in cross section. The absorber rod comprises a plurality of fuel pellets 15 and 8a stacked on top of each other in a cladding tube 7 and a top plug 16 and a bottom plug 17 seal the absorber rod. The fuel. pellets 15 contain a certain part of a burnable absorber. The two end pellets 8a in the absorber rod only contain fuel and lack burnable absorber. The end pellets in both the fuel rods and the absorber rods adjoin axial gaps which arise between the fuel units in the stack. Because of the axial gap, the moderation and hence the reactivity become higher in the end pellets compared with the other pellets in the stack. By not adding any burnable absorber to the fuel in the end pellets, the end pellets in the fuel unit are burnt up faster than other pellets. The burnup takes place at the beginning of the operating cycle while the total power of the fuel assembly is still limited by the burnable absorber. Since it is necessary in some way, for example by a lower enrichment or by providing them with holes, to limit the power in the end pellets of the fuel rods, it is an advantage that all the end pellets are identical so that the manufacture is simplified.

In this embodiment, all the fuel units have the same kind of lattice. It is an advantage that all the fuel units have the same lattice because then the same bottom tie plates and top tie plates may be used for the different fuel units, which minimizes the number of components which need to be manufactured and kept in stock. It is also possible, while maintaining the same lattice, to carry out optimizations by limited displacements of the positions of the rods.

In another embodiment, fuel units at the same level in the fuel assembly may have different distribution of fuel rods. This may, for example, be advantageous in a reactor where the fuel assembly is surrounded by water gaps with different widths. The moderation becomes different depending on which gaps a fuel unit is facing, which may be compensated for by arranging fuel rods with larger or smaller diameters in lattice positions adjacent the gaps.

What is claimed is:

1. A fuel assembly for a boiling water reactor, comprising:
   a top tie plate;
   a bottom tie plate;
   a plurality of fuel rods arranged in a lattice and extending between the top tie plate and the bottom tie plate;
   a fuel channel surrounding the plurality of fuel rods and having a substantially square cross section;
   a plurality of fuel units stacked on top of each other in an axial distribution, each fuel unit comprising a top tie plate, a bottom tie plate, and a plurality of fuel rods arranged between the top tie plate and the bottom tie plate, at least one of the fuel units comprising a plurality of fuel rods having at least two different diameters and different quantities of fuel arranged in a lateral distribution, wherein said axial and lateral distribution optimize a quantity of fuel and a lattice spacing both axially and laterally in the fuel assembly.

2. The fuel assembly according to claim 1, wherein the fuel assembly comprises at least seven fuel units.

3. The fuel assembly according to claim 1, wherein the at least one of the fuel unit comprises fuel rods having at least three different diameters and different fuel quantities.

4. The fuel assembly according to claim 3, wherein the fuel rods have a first diameter, a second diameter at least 5% larger than the first diameter, and a third diameter at least 5% larger than the second diameter.

5. The fuel assembly according to claim 4, wherein the fuel assembly comprises at least seven fuel units.

6. The fuel assembly according to claim 1, wherein the fuel assembly comprises at least seven fuel units.

7. The fuel assembly according to claim 1, wherein at least one lattice position is unoccupied in one fuel unit.

8. The fuel assembly according to claim 1, further comprising:
   a plurality of absorber rods containing burnable absorber material, wherein at least two of the absorber rods have different diameters.

9. The fuel assembly according to claim 8, wherein end pellets of the absorber rods lack burnable absorber material.

10. The fuel assembly according to claim 1, wherein all of the fuel rods are constructed such that the top tie plates of each fuel unit are substantially identical and that the bottom tie plates of each fuel unit are substantially identical.

* * * * *